US009712992B2

(12) United States Patent
Johansson et al.

(10) Patent No.: US 9,712,992 B2
(45) Date of Patent: *Jul. 18, 2017

(54) SYSTEM, METHOD AND DEVICES RELATED TO RADIO COMMUNICATION EQUIPMENT (71) Applicant: Telefonaktiebolaget LM Ericsson (publ), Stockholm (SE)

(72) Inventors: Rune Johansson, Upplands Väsby (SE); Per Gustafsson, Saltsjö-Boo (SE); Jan-Erik Lundberg, Sollentuna (SE); Claudia Muñiz Garcia, Stockholm (SE); Ulf Persson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 18 days.

This patent is subject to a terminal disclaimer.

(21) Appl. No.: 14/155,461

(22) Filed: Jan. 15, 2014

(65) Prior Publication Data
US 2014/0128055 A1 May 8, 2014

Related U.S. Application Data (63) Continuation of application No. 13/091,678, filed on Apr. 21, 2011, now Pat. No. 8,655,388.

(51) Int. Cl.
H04M 1/00 (2006.01)
H04W 8/06 (2009.01)
(Continued)

(52) U.S. Cl.
CPC ............. H04W 8/06 (2013.01); H04W 24/00 (2013.01); H04W 36/38 (2013.01)

(58) Field of Classification Search
CPC ....... H04W 88/02; H04W 88/08; H04W 4/00; H04W 92/02
(Continued)

(56) References Cited

U.S. PATENT DOCUMENTS 6,230,105 B1 * 5/2001 Harris ................ G01R 29/0842
324/72
2006/0277309 A1 12/2006 Eaton
2008/0300022 A1 12/2008 Dong et al.

FOREIGN PATENT DOCUMENTS

| JP | 11355305 A | 12/1999 |
| WO | 0163952 A1 | 8/2001 |
| WO | 2007118211 A2 | 10/2007 |

OTHER PUBLICATIONS

Antenna Interface Standards Group, "Control interface for antenna line devices", Standard No. AISG v2.0., Jun. 13, 2006, pp. 1-41.

* cited by examiner

Primary Examiner — Temica M Beamer
(74) Attorney, Agent, or Firm — Coats & Bennett, PLLC (57) ABSTRACT A system in radio communication comprising a controller, a first device, and a second device is provided. The first device is associated with a first particular sector of a radio communication cell and the second device is associated with a second particular sector of the radio communication cell. The first device comprises a first sector indicating hardware and the second device comprises a second sector indicating hardware. The first and second sector indicating hardware each comprises a first visual sector information relating to the first particular sector such that the first visual sector information is visible to a human, and a first electronically readable sector information relating to the first particular sector. Each device comprises a first reading arrangement for reading the electronically readable sector information.

28 Claims, 6 Drawing Sheets (51) Int. Cl.
*H04W 24/00* (2009.01)
*H04W 36/38* (2009.01)

(58) Field of Classification Search
USPC .............................. 455/422.1, 566, 419, 457
See application file for complete search history.

SYSTEM, METHOD AND DEVICES RELATED TO RADIO COMMUNICATION EQUIPMENT

RELATED APPLICATIONS

The present application is a continuation of U.S. patent application Ser. No. 13/091,678, which was filed on Apr. 21, 2011, which claims the benefit of PCT/SE2011/050460, filed Apr. 14, 2011, the disclosures of each of which are incorporated herein by reference in their entirety.

TECHNICAL FIELD

The technical field relates to a device and a controller of radio communication equipment. The device and the controller are located remote from each other. Further aspects relate to a sector indicating hardware for a device. Further aspects relate to a system comprising a controller and a first device. Further aspects relate to a method of establishing a connection via a network between a controller and a first device.

BACKGROUND

Radio communication networks use antennas to transmit and receive radio signals from mobile terminals, such as mobile phones. Support structure mounted devices are usually installed and connected to these antennas. Examples of support structures are antenna masts, towers and other buildings. Examples of support structure mounted devices may be antenna line devices (ALD) and devices comprising radio communication equipment capable of performing more advanced tasks in the radio communication network such as Remote Radio Units (RRU).

The support structure mounted devices have in common that they are related to a particular sector of a radio communication cell. Furthermore, the support structure mounted devices are connected to a controller of the radio communication network, which controller is arranged at a distance from the support structure mounted devices and may be associated with more than one sector of the radio communication cell. Commonly, the structure mounted devices may be connected via one or more wires to the controller.

In practice the connection of support structure mounted devices and controller on-site may be non-trivial. Experience shows that mistakes may easily be made. One example may be the installation of an antenna system. The support structure such as a tower is mounted by service personnel to install e.g. three ALD:s, each one associated with a different sector of a relevant radio communication cell. The ALD:s are connected via wire to a controller located remotely from the ALD:s, e.g. in housing at the foot of the tower. Identification numbers for each ALD are noted together with the relevant sector for each ALD. These notes, commonly provided handwritten on paper, are passed on to other personnel responsible for network configuration for generating files used for network configuration in the controller. It easily may be understood that the above discussed procedure often fails. The consequence may be that the system does not operate as intended requiring further installation efforts and making operators hesitant to consider systems including ALD:s. Alternatively, the controller may perform a scan for devices connected to the controller, e.g. as disclosed in US 2006/0277309 A1. However, the controller will find the devices without any idea about their relative position in relation to sectors of any radio communication cells.

In a different scenario a number of Remote Radio Units (RRU:s), at least two of which are associated with different sectors of one or more radio communication cells, may be installed on one or more support structures such as one or more buildings and be connected via wire, e.g. optical fibres, to a remotely located Main Unit (MU) comprising a controller. The MU may be located in the basement of a building at a distance of several kilometres from the RRU:s. Each fibre must be connected to the right port of the MU according to a pre-defined configuration in order for the controller to know which sector of the one or more radio communication cells is connected to which port. It is important that each port of the MU is connected to the right RU. In the above described situation it is impossible for service personnel to verify that each optical fibre is connected to the right port. Faulty cabling will complicate cell planning and seriously degrade radio net performance. To correct mistakes, site visits are needed and there may be a need for service personnel to climb to the RRU:s to check which fibre is connected to which RRU.

The Antenna Interface Standards Group Standard No. AISG v 2.0 is concerned with a control interface for antenna line devices. According to the standard a UniqueID is a global unique identifier of an Antenna Line Device (ALD). An ALD is a generic term for an addressable physical device, such as an antenna driver or amplifier. The standard does not provide any solution to the problem of ensuring reliable connection between a device relating to a particular sector and a controller.

US 2008/0300022 A1 discloses a method and a system for parameter configuration of an ALD. By means of a master station device an antenna port of the device is scanned for identification information of one or more ALD:s. Obtained identification information is used for performing the parameter configuration. However, since the identification information does not relate to any sector of a particular ALD, the problem of ensuring reliable connection between an ALD relating to a particular sector and a controller remains.

WO2007/118211 A2 discloses automatic setting of antenna related parameters such as power, angle, azimuth. Readings from sensors in antenna systems are communicated to a central controller. The central controller may determine desired operating parameters and send these to the antennas.

SUMMARY

An object may be to provide for a device and a controller remote from the controller, to improve at least parts of a process of connecting the device and the controller.

According to one aspect, the object may be achieved by a device related to radio communication equipment. The device is adapted to be connected to a controller located remote from the device. The controller is associated with at least a first particular sector of a radio communication cell. The device is assigned to a first identity and the device comprises a sector indicating hardware. The device is associated with the first particular sector. The sector indicating hardware comprises:

a visual sector information relating to the first particular sector such that the visual sector information is visible to a human, and an electronically readable sector information relating to the first particular sector. The device comprises a reading arrangement for reading the electronically readable sector information relating to the first particular sector from the sector indicating hardware.

Since the sector indicating hardware comprises both visible and electronically readable sector information relating to the first particular sector it may be ensured that service personnel may be fully aware of, to which sector the device relates. Faulty association between sector and the device may thus be avoided. As a result, the above mentioned object may be achieved. Furthermore, the controller may communicate with the reading arrangement to inquire the electronically readable sector information and it may be ensured that the controller is connected to the device relating to the first particular sector which may be associated with the first identity in the controller.

The term "particular sector" is herein to be interpreted as any particular sector of a radio communication cell and not only to a sector having a specific sector number. For instance the term "first particular sector" may refer to sector number two of a radio communication cell or to a sector directed westward. Sector information may be indicated directly or indirectly, for instance by a sector number as such, by a point of the compass or similar. The reading arrangement may be an electronic circuit, it may comprise for instance discrete components or a processing unit. The device may be attached to a supporting structure such as a mast, a tower or other building structure.

According to embodiments the sector indicating hardware may comprise a setting element, such as a switch or a connector, for setting the sector indicating hardware to relate to the first particular sector. In this manner service personnel may install the device, e.g. in an antenna mast, to a rooftop or in a tunnel, and during installation set the sector indicating hardware to relate to a particular sector. Thus, service personnel may ensure that the device is associated with the relevant particular sector the device is arranged to relate to. The visual sector information and the electronically readable sector information may be set simultaneously. Accordingly, it may be relied upon the electronically readable sector information being correct when the controller is connected to the device.

According to embodiments the device may comprise a connector socket or connector plug and the setting element may comprise a connecting element adapted for interconnecting at least two conductors of the connector socket or connector plug. In this manner service personnel may easily set the visual sector information and the electronically readable sector information to relate to the first particular sector by selecting a setting element coded for the first particular sector. For instance may the setting element have a particular colour and/or be provided with a number depending on which conductors are interconnected. Different conductors are interconnected in different setting elements and may thus be used to relate to different sectors.

According to embodiments the device may comprise a location indicating hardware. The location indicating hardware may comprise:
 a visual location information relating to a location of the device such that the visual location information is visible to a human, and
 an electronically readable location information relating to the location of the device. The reading arrangement may be adapted to read the electronically readable location information from the location indicating hardware. In this manner the device may be distinguishable from further devices related to the first particular sector.

The term "location information" may be used to relate to different parameters such as to a physical location of the device, e.g. in relation to other devices of the first particular sector, or to a particular operator related to the device, or to a particular supporting structure, or to a particular cluster of devices. A cluster of devices may comprise devices in the same geographical area or devices arranged on the same supporting structure, where each cluster may be assigned to e.g. a specific frequency band, a specific operator, or to a specific radio communication standard or system such as e.g. GSM, WCDMA, LTE, 3GPP, WiMax, and UMB.

According to embodiments the device may comprise an Antenna Line Device (ALD), or a Remote Radio Unit (RRU), or an Antenna Integrated Radio (AIR), or a Tower Mounted Amplifier (TMA), or a Remote Electrical Tilting device (RET).

According to a further aspect, the object may be achieved by a controller adapted to be connected via a network to a first device. The first device is assigned to a first identity. The controller and the first device are comprised in radio communication equipment. The controller is located at a distance from the first device and the first device is associated with a first particular sector of a radio communication cell. The first device comprises a first sector indicating hardware. The first sector indicating hardware comprises:
 a first visual sector information relating to the first particular sector such that the first visual sector information is visible to a human, and
 a first electronically readable sector information relating to the first particular sector. The first device comprises a first reading arrangement for reading the first electronically readable sector information relating to the first particular sector from the first sector indicating hardware. The controller is adapted to send an inquiry to the first device. The inquiry is for a first identity related information related to the first device. The inquiry to the first device is directed to the first device based on its association with the first particular sector.

Since the controller by means of the inquiry directed to the first device based on its association with the first particular sector may learn the first identity related information related to the first device it may be ensured that the controller will associate the first device with the first particular sector. As a result, the above mentioned object may be achieved.

According to embodiments the controller may be comprised in a radio device associated with radio communication in the first particular sector to be connected with the first device.

According to embodiments the controller may be adapted to connect the first device to a first radio device associated with radio communication in the first particular sector.

According to embodiments the controller may be adapted to be connected via the network to a second device being assigned to a second identity and which second device is comprised in radio communication equipment. The controller is located at a distance from the second device and the second device is associated with a second particular sector of the radio communication cell. The second device may comprise a second sector indicating hardware. The second sector indicating hardware comprises:
 a second visual sector information relating to the second particular sector such that the second visual sector information is visible to a human, and
 a second electronically readable sector information relating to the second particular sector. The second device may comprise a second reading arrangement for reading the second electronically readable sector information relating to the second particular sector from the second sector indicating hardware. The controller may be adapted to send an inquiry to the second device, which inquiry is for a second identity related information related to the second device. The inquiry to the second device may be directed to the second device based on its association with the second particular sector. In this manner the controller by means of the inquiry directed to the second device based on its association with the second particular sector may learn the second identity related information related to the second device. The controller may thus associate the second device with the second particular sector. It may thus be ensured that radio communication may take place correctly in the first particular sector and the second particular sector.

According to embodiments the first device may comprise a first location indicating hardware, and the first location indicating hardware may comprise:
- a first visual location information relating to a location of the device such that the first visual location information is visible to a human, and
- a first electronically readable location information relating to the location of the first device. The reading arrangement may be adapted to read the first electronically readable location information from the first location indicating hardware. The inquiry may be directed to the first device based on the location of the first device.

According to a further aspect, the object may be achieved by a system comprising a controller and a first device being assigned to a first identity and a second device being assigned to a second identity. The controller, the first device and the second device are comprised in radio communication equipment. The controller is connected to at least the first device and the second device via a network. The first device and the second device are located at a distance from the controller. The first device is associated with a first particular sector of a radio communication cell and the second device is associated with a second particular sector of the radio communication cell. The first device comprises a first sector indicating hardware and the second device comprises a second sector indicating hardware. The first sector indicating hardware comprises:
- a first visual sector information relating to the first particular sector such that the first visual sector information is visible to a human, and
- a first electronically readable sector information relating to the first particular sector. The first device comprises a first reading arrangement for reading the first electronically readable sector information relating to the first particular sector from the first sector indicating hardware. The second sector indicating hardware comprises:
- a second visual sector information relating to the second particular sector such that the second visual sector information is visible to a human, and
- a second electronically readable sector information relating to the second particular sector. The second device comprises a second reading arrangement for reading the second electronically readable sector information relating to the second particular sector from the second sector indicating hardware.

Since the sector indicating hardware of the first and second devices comprise both visible and electronically readable sector information relating to the first particular sector it may be ensured that service personnel may be fully aware of which sector the device relates to. Faulty association between the first particular sector and the first device, and between the second particular sector and the second device may thus be avoided. As a result, the above mentioned object may be achieved. Furthermore, thanks to the electronically readable sector information, the controller may associate the first identity with the first device and the first particular sector and the second identity with the second device and the second particular sector.

According to embodiments the first sector indicating hardware may comprise a first setting element, such as switch or a connector, for setting the first sector indicating hardware to relate to the first particular sector. The second sector indicating hardware may comprise a second setting element, such as switch or a connector, for setting the second sector indicating hardware to relate to the second particular sector. In this manner service personnel may set a relevant particular sector for each of the first and second devices.

According to embodiments the first device may comprise a first location indicating hardware. The first location indicating hardware may comprise:
- a first visual location information relating to a location of the first device such that the first visual location information is visible to a human, and
- a first electronically readable location information relating to the location of the first device. The first reading arrangement may be adapted to read the first electronically readable location information from the first location indicating hardware. The second device may comprise a second location indicating hardware. The second location indicating hardware may comprise:
- a second visual location information relating to a location of the second device such that the second visual location information is visible to a human, and
- a second electronically readable location information relating to the location of the second device. The second reading arrangement may be adapted to read the second electronically readable location information from the second location indicating hardware.

According to embodiments the first and second devices may comprise an Antenna Line Device (ALD), or a Remote Radio Unit (RRU), or an Antenna Integrated Radio (AIR), or a Tower Mounted Amplifier (TMA), or a Remote Electrical Tilting device (RET). The first and second devices may be different types of devices.

According to a further aspect, the object may be achieved by a sector indicating hardware for a device according to embodiments disclosed herein. The sector indicating hardware comprises a setting element for setting the sector indicating hardware to relate to a particular sector of a radio communication cell. The setting element comprises a connecting element adapted for interconnecting at least two conductors of a connector socket or a connector plug of the device.

Service personnel may ensure that a correct particular sector is indicated for a particular device by selecting a particular sector indicating hardware indicating a particular sector. Faulty association between sector and the device may thus be avoided. As a result, the above mentioned object may be achieved. The setting element may have a colour and/or be provided with a number depending on which conductors of the setting element are interconnected, to visually indicate a particular sector. Different conductors may be interconnected in different setting elements and may thus be used to relate to different sectors.

According to a further aspect, the object may be achieved by a method of establishing a connection via a network between a controller and a first device. The first device is assigned to a first identity. The controller is located at a distance from the first device and the first device is associated with a first particular sector of a radio communication cell. The first device comprises a first sector indicating hardware which provides electronically readable sector information relating to the first particular sector. The method comprises:

setting the electronically readable sector information relating to the first particular sector on the first sector indicating hardware manually, sending from the controller via the network an inquiry to the first device, which inquiry is for a first identity related information related to the first device, wherein the inquiry is directed to the first device based on its association with the first particular sector.

Since the sector indicating hardware may be set manually, service personnel may ensure that a correct sector is indicated for the first device. Faulty association between sector and the device may thus be avoided. As a result, the above mentioned object may be achieved. Furthermore, since the controller by means of the inquiry directed to the first device based on its association with the first particular sector may learn the first identity related information related to the first device it may be ensured that the controller will associate the first device with the first particular sector.

According to embodiments the method may comprise establishing a connection via the network between the controller and a second device. The second device may be assigned to a second identity. The controller is located at a distance from the second device and the second device is associated with a second particular sector of the radio communication cell. The second device may comprise a second sector indicating hardware which provides second electronically readable sector information relating to the second particular sector. The method may comprise:

setting the second electronically readable sector information relating to the second particular sector on the second sector indicating hardware manually, sending from the controller via the network an inquiry to the second device, which inquiry is for a second identity related information related to the second device, wherein the inquiry is directed to the second device based on its association with the second particular sector. In this manner the controller may associate the second device with the second particular sector.

According to embodiments the first device may comprise a first location indicating hardware which comprises a first electronically readable location information relating to the first device. The method may comprise:

setting the first electronically readable location information relating to a location of the first device on the first location indicating hardware manually, sending from the controller via the network an inquiry to the first device, which inquiry is for a first identity related information related to the first device. The inquiry may be directed to the first device based on its association with the location of the first device. In this manner the controller may associate further parameters with the first device.

According to embodiments sending from the controller via the network an inquiry to the first device may comprise: sending the inquiry to the first device and the second device.

In this manner the controller may simply send the inquiry via the network and receive a response from the first device only due to the first device being associated with the first particular sector.

Further features and advantages will become apparent when studying the appended claims and the following detailed description. Those skilled in the art will realize that different features of embodiments may be combined to create embodiments other than those described in the following, without departing from the scope defined by the appended claims.

BRIEF DESCRIPTION OF THE DRAWINGS

The various aspects of embodiments will be readily understood from the following detailed description and the accompanying drawings, in which.

DETAILED DESCRIPTION

Embodiments will now be described more fully with reference to the accompanying drawings. Disclosed features of example embodiments may be combined as readily understood by one of ordinary skill in the art. Like numbers refer to like elements throughout.

Well-known functions or constructions will not necessarily be described in detail for brevity and/or clarity.

Figure 1:
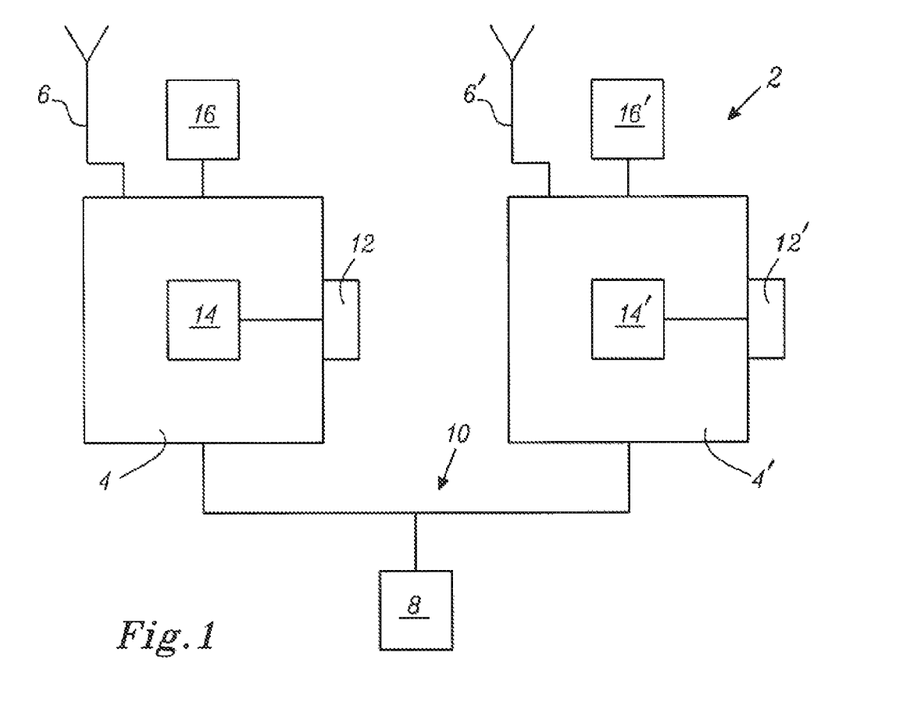
FIGS. 1 and 2 illustrates embodiments of systems forming part of radio communication systems and comprising radio communication equipment.

FIG. 1 illustrates embodiments of a system 2 forming part of a radio communication system and comprising radio communication equipment. The system 2 comprises a first device 4 being assigned to a first identity and a second device 4' being assigned to a second identity. The first and second devices 4, 4' are adapted to be supported by a support structure such as an antenna mast or a wall of a built structure. The first and second devices 4, 4' may be supported by the same support structure or by different support structures. The first device 4 is associated with a first particular sector of a radio communication cell and the second device 4' is associated with a second particular sector of the radio communication cell. The first and second devices 4, 4' are each an Antenna Line Device (ALD) such as a Tower Mounted Amplifier (TMA). Each TMA is connected to an antenna 6, 6' of the radio communication system.

The system further comprises a controller 8. The controller 8 is located at a distance from the first device 4 and the second device 4', and is connected to at least the first device 4 and the second device 4' via a network 10. Accordingly, the controller 8 is associated with at least the first particular sector and the second particular sector of the radio communication cell. The controller 8 may be comprised in a Main Unit, a Radio Base Station, a Node B, or similar apparatus of the radio communication system. The controller 8 itself or the Main Unit, the base station, the Node B, or similar apparatus which is associated with the controller 8, must be connected correctly to the first device 4 and the second device 4' in order to ensure reliable radio communication in the radio communication system.

The first device 4 comprises a first sector indicating hardware 12. The first sector indicating hardware 12 comprises a first visual sector information relating to the first particular sector and a first electronically readable sector information relating to the first particular sector. The first visual sector information is visible to a human. For instance service personnel may thus, verify that the first device 4 is arranged on the support structure such that it relates to the first particular sector. Alternatively, if the first sector indicating hardware 12 may be set, service personnel may set the first sector indicating hardware 12 to relate to the first particular sector. In the latter case also the electronically readable sector information may suitably be set simultaneously. Similarly, the second device 4' comprises a second sector indicating hardware 12'. The second sector indicating hardware 12' comprises a second visual sector information relating to the second particular sector and a second electronically readable sector information relating to the second particular sector. The second visual sector information is visible to a human. Again, for instance service personnel may thus, verify that the second device 4' is arranged on the support structure such that it relates to the second particular sector. Alternatively, if the second sector indicating hardware 12' may be set, service personnel may set the second sector indicating hardware 12' to relate to the second particular sector. In the latter case also the second electronically readable sector information may suitably be set simultaneously. The visual sector information and the electronically readable sector information may relate to an actual sector number or to a point of compass. Embodiments of the first and second sector indicating hardware 12, 12' are illustrated in more detail below.

The first device 4 comprises a first reading arrangement 14 for reading the first electronically readable sector information relating to the first particular sector from the first sector indicating hardware 12. The second device 4' comprises a second reading arrangement 14' for reading the second electronically readable sector information relating to the second particular sector from the second sector indicating hardware 12'. The reading arrangements 14, 14' may comprise discrete electronics or microprocessors and are adapted to read the respective first and second electronically readable sector information. Thus, the controller 8, in communication with the first and second devices 4, 4' may associate a particular sector with a particular device 4, 4'. Accordingly, the controller 8 is adapted to send an inquiry to the first device 4, which inquiry is for a first identity related information related to the first device. The inquiry to the first device 4 is directed to the first device based on its association with the first particular sector. Consequently, the first device 4 is adapted to receive the inquiry from the controller 8, which inquiry is for the identity related information related to the first device 4. The first device 4 is adapted to send a response to the controller 8, which response comprises the identity related information related to the first device 4. The controller 8 is thus adapted to receive the response from the first device 4, which response comprises the first identity related information.

Furthermore, the controller 8 is adapted to send an inquiry to the second device 4', which inquiry is for a second identity related information related to the second device. The inquiry to the second device 4' is directed to the second device based on its association with the second particular sector. Consequently, also the second device 4' is adapted to receive the inquiry from the controller 8, which inquiry is for the second identity related information related to the second device 4'. The second device 4' is adapted to send a response to the controller 8, which response comprises the second identity related information related to the second device 4'. The controller 8 is thus adapted to receive the response from the second device 4', which response comprises the second identity related information.

The inquiry to the first device 4 is sent from the controller 8 via the network 10. The inquiry to the first device 4 may be sent on the network 10 to both the first device 4 and the second device 4'. The controller 8 will receive a response from the first device 4 only, due to the first device 4 being associated with the first particular sector. Similarly, the inquiry to the second device 4' may be sent on the network 10 to both the first device 4 and the second device 4'. The controller 8 will receive a response from the second device 4' only, due to the second device 4' being associated with the second particular sector.

The controller 8 may accordingly, assign the first identity related information such as the first identity of the first device 4, with the first device 4 based on its association with the first particular sector. Similarly, the controller 8 may assign the second identity of the second device 4', with the second device 4' based on its association with the second particular sector.

By means of the first and second sector indicating hardware 12, 12', a correct connection between the controller 8 and the first device 4, as well as between the controller 8 and the second device 4' may be established via the network 10. Thus, in the system 2, radio communication signals may be directed via the network 10 between the controller 8 and the respective first and second devices 4, 4', according to radio communication standards, depending on in which of the first and second particular sectors a mobile communication device is located. It may be noted that setting the first and second sector indicating hardware 12, 12' to relate to a particular sector may be facilitated to such a degree that even lesser skilled personnel may perform such setting.

A TMA may be connected with further equipment of the radio communication system. In FIG. 1 a connection with a respective antenna 6, 6' has already been mentioned. Further equipment connected to a TMA may comprise a Remote Electrical Tilting device (RET) 16, 16'. The respective antennas 6, 6' may be tilted about a respective substantially horizontal axis by a respective RET 16, 16'. After a connection has been established between the controller 8 and a TMA, e.g. the first device 4, the controller 8 may send tilting data to the RET 16 of the first device 4 via the network 10 to set a tilting angle of the antenna 6 of the first device 4.

Figure 2:
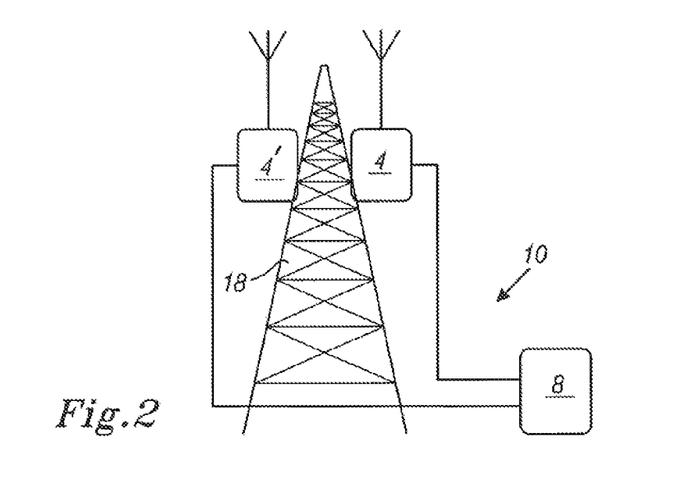

FIG. 2 illustrates embodiments of a system 2 forming part of a radio communication system and comprising radio communication equipment similar to the system 2 disclosed in FIG. 1. The system of FIG. 2 comprises a controller 8 connected to a first device 4 and a second device 4' via a network 10. The first and second devices 4, 4' are mounted to a supporting structure in the form of an antenna mast 18. The network 10 comprises separate connections between the controller 8 and the first device 4 and the second device 4'. In the system 2 of FIG. 1 in contrast, the network 10 comprises a at least partially a common connection between the controller 8 and the first and second devices 4, 4'.

Figure 3:
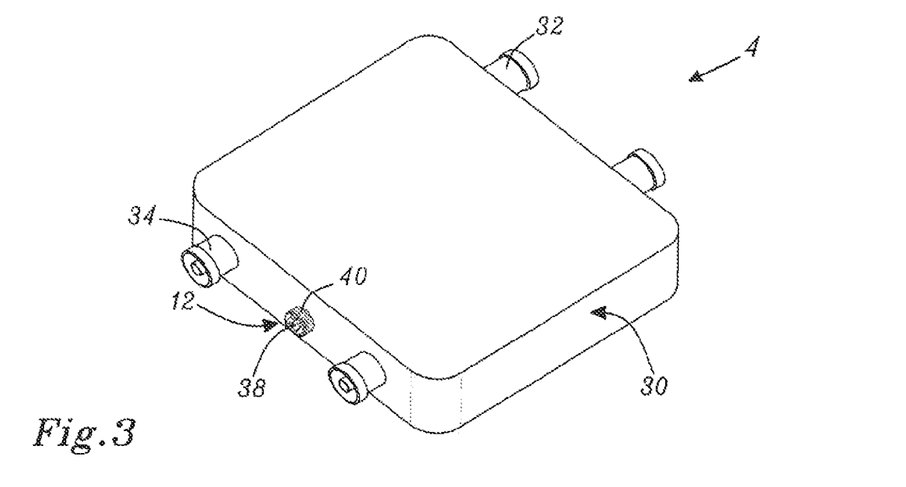
FIG. 3 illustrates a device related to radio communication equipment according to embodiments.

FIG. 3 illustrates a device 4 related to radio communication equipment according to embodiments. The device 4 may be comprised in a radio communication system. The device 4 comprises a Tower Mounted Amplifier (TMA) 30. The TMA 30 comprises at least one antenna connector 32 for connecting an antenna of the radio communication equipment to the TMA 30. The TMA 30 comprises at least one Radio Base Station connector 34 for connecting the TMA 30 to a Radio Base Station (RBS) or similar apparatus of the radio communication system. The RBS or similar apparatus comprises a controller adapted to communicate with the TMA 30.

The TMA 30 comprises a sector indicating hardware 12. The sector indicating hardware 38 comprises a connector socket 38 for connecting a RET to the TMA 30. The sector indicating hardware 12 comprises further a setting element 40. The setting element 40 comprises a connecting element which interconnects conductors of the connector socket 38. The TMA 30 comprises a reading arrangement, which may read which conductors of the connector socket 38 are interconnected by the setting element 40. Different conductors of the connector socket 38 may be interconnected by using different connecting elements 40 which are differently configured to interconnect different conductors of the connector socket 38. The different connecting elements 40 may be differently shaped, differently coloured and/or be provided with different markings to make the different connecting elements visually distinguishable from each other.

By assigning a setting element 40 with a particular configuration of interconnected conductors and with a particular visual characteristic to relate to a particular sector of a radio communication cell, the particular sector may be set both visually and electronically when the setting element 40 is connected to the connector socket 38 of a particular TMA 30. Thus, the sector indicating hardware 12 comprises both a visual sector information relating to a particular sector such that the visual sector information is visible to a human, and an electronically readable sector information relating to the particular sector. Depending on for which particular sector of a radio communication cell a TMA 30 mounted to a supporting structure is arranged to operate, service personnel may select the corresponding setting element 40 and place it on the connector socket 38 before the RET is connected to the TMA 30. Thus, the sector indicating hardware 12 will be set to relate to the particular sector.

Figure 4:
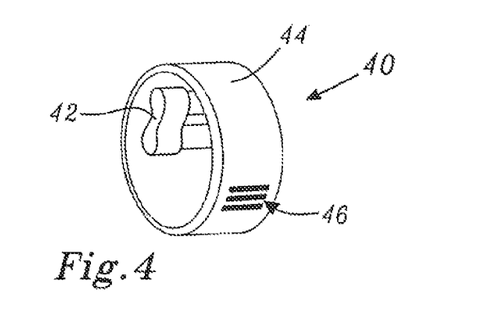
FIG. 4 illustrates a setting element of a sector indicating hardware according to embodiments.

FIG. 4 illustrates a setting element 40 of a sector indicating hardware according to embodiments. The setting element 40 comprises a connecting element 42 adapted for interconnecting at least two conductors of a connector socket or a connector plug. Further, the setting element 40 comprises a sleeve 44.

There may be provided a set of different setting elements 40. The different setting elements 40 of the set may comprise differently configured connecting elements 42 adapted to interconnect different conductors of a connector socket or plug. Furthermore, the different setting elements 40 of the set may be differently coloured and be provided with different line coding 46, such that each setting element 40 with a particularly configured connecting element 42 is coloured with one colour and provided with one line coding 46. Thus, the set of setting elements 40 may comprise at least one setting element 40 each of the differently configured connecting elements 42 which may be utilized for setting a sector indicating hardware of a device related to radio communication equipment to related to a particular sector of a radio communication cell. Service personnel may select a setting element 40 from the set and place it for instance on sector indicating hardware comprising a connector socket of a TMA. The connector socket may be a connector socket for a RET, an antenna, an RBS, or other connected apparatus.

The sector indicating hardware thus, may be set to relate to the particular sector. This may be done on location at a support structure where a relevant device comprising the sector indicating hardware is installed.

Figure 5:
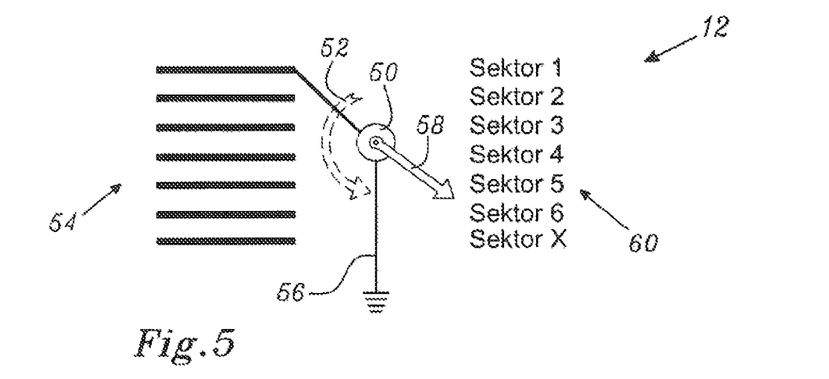
FIGS. 5 and 6 illustrates schematically sector indicating hardware according to embodiments.

FIG. 5 illustrates schematically a sector indicating hardware 12 according to embodiments. The sector indicating hardware 12 comprises a setting element in the form of a switch 50 for setting the sector indicating hardware 12 to relate to a particular sector. The switch 50 may be rotated back and forth along the direction indicated by arrow 52. Electrically, the sector indicating hardware 12 connects by means of the switch 50, one of several ports 54 to ground 56. Simultaneously, the switch 50 indicates visually, by means of a pointer 58 and sector labels 60 arranged on the sector indicating hardware 12, one of several sectors.

The sector indicating hardware 12 is adapted to be arranged in a device related to radio communication equipment, which device is associated with a particular sector of a radio communication cell. The ports 54 are connected to a reading arrangement of the device. The reading arrangement is adapted to read which of the ports 54 is connected to ground 56. By turning the switch 50 to a particular position, a particular port of the several ports 54 is connected to ground 56 and the pointer 58 points to a particular sector label 60. Accordingly, the sector indicating hardware 12 comprises an electronically readable sector information relating to the particular sector, and a visual sector information relating to the particular sector which is visible to a human. Thus, the sector indicating hardware 12 may be set to correspond to the particular sector associated with the device. The reading arrangement of the device may read the electronically readable sector information.

Figure 6:
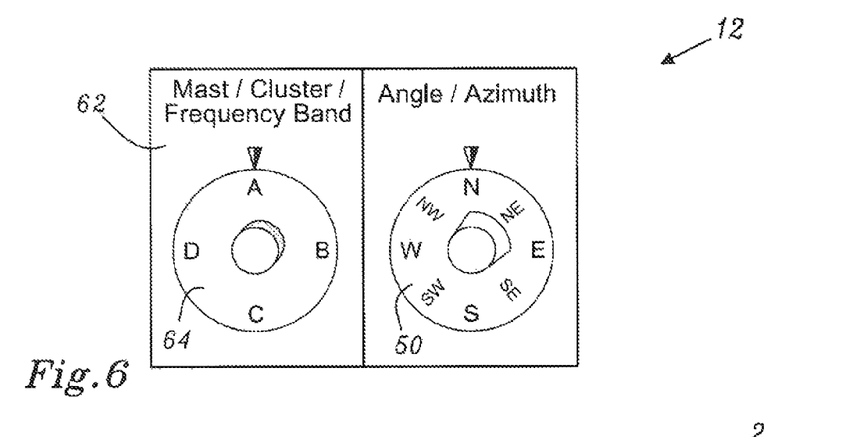

FIG. 6 illustrates a sector indicating hardware 12 according to embodiments. The sector indicating hardware 12 may be designed as explained in connection with the FIG. 5 embodiments. The sector indicating hardware 12 is adapted to be arranged in a device related to radio communication equipment, which device is associated with a particular sector of a radio communication cell. Visual sector information is provided by the sector indicating hardware 12 in the form of point of compass. A switch 50 of the sector indicating hardware 12 may be turned to relate to the particular sector by means of indicating the point of compass direction of the device associated with the particular sector.

In other embodiments the sector indicating hardware may automatically determine the point of compass direction using e.g. a built in electronic compass. In such embodiment the point of compass direction and/or the related sector derived from the point of the compass may be read from a display on the device or read by service personnel using devices adapted to read such information.

The sector indicating hardware 12 comprises a location indicating hardware 62. The location indicating hardware 62 comprises a visual location information relating to a location of the device. The visual location information is visible to a human. The location indicating hardware 62 further comprises an electronically readable location information relating to the location of the device. The location indicating hardware 62 may be designed as the explained in connection with the sector indicating hardware 12 of FIG. 5. A location switch 64 is adapted to be set in one out of several positions. Visual location information is provided by the location indicating hardware 62 by means of the location switch 64 pointing to, e.g. letters or digits relating to a location associated with the device related to radio communication equipment. The location indicated by the location indicating hardware 62 may relate to a particular cluster of devices related to a particular radio communication operator, or location indicated by the location indicating hardware 62 may relate to a particular supporting structure, or to a particular section of a supporting structure. The location indicating hardware 62 is connected to a reading arrangement of the device. The reading arrangement is adapted to read the electronically readable location information from the location indicating hardware 62. Consequently, an inquiry may be directed to a device comprising the sector indicating hardware 12 comprising the location indicating hardware 62 based on the location of the device.

Figure 7:
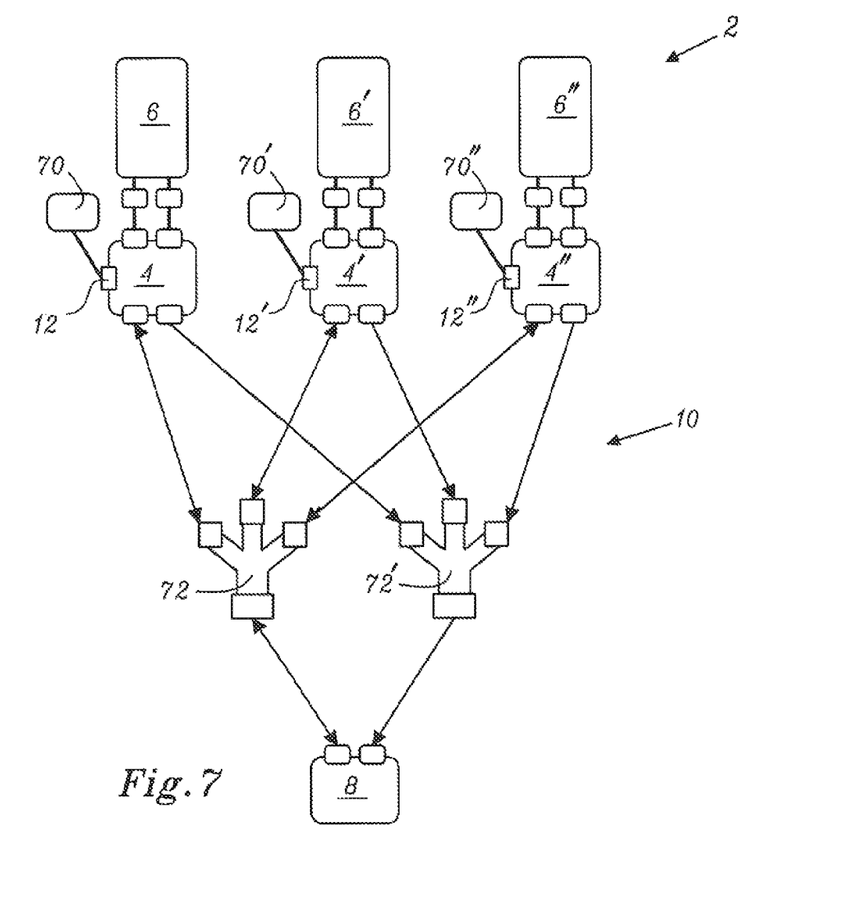
FIGS. 7-9 illustrate embodiments of systems forming part of radio communication systems and comprising radio communication equipment.

In other embodiments the location indication hardware may automatically determine the geographic location using e.g. a built in GPS and/or gyroscope and/or triangulation. In such embodiment the location may be read from a display on the device, or read by service personnel using devices adapted to read such information FIG. 7 illustrates embodiments of a system 2 forming part of a radio communication system and comprising radio communication equipment. The system 2 comprises a first, a second, and a third device 4, 4', 4" being assigned to a first, a second and a third identity, respectively. The devices 4, 4', 4" are adapted to be supported by one or more support structures such as antenna masts or walls of different kinds of built structures. Each of the device 4, 4', 4" is associated with a particular sector of a radio communication cell. Each of the devices 4, 4', 4" comprises a TMA. Each device 4, 4', 4" is connected to an antenna 6, 6', 6" of the radio communication system and to an RET 70, 70', 70". The system 2 further comprises a controller 8. The controller 8 is located at a distance from the devices 4, 4', 4". The controller 8 is connected to the devices 4, 4', 4" via a network 10. The controller 8 may be comprised in an RBS or similar apparatus of the radio communication system.

Each device 4, 4', 4" is provided with a sector indicating hardware 12, 12', 12". Each sector indicating hardware 12, 12', 12" comprises for instance the above mentioned connector socket 38 and setting element 40 comprising a connecting element 42. The first device 4 is, by means of the first sector indicating hardware 12 and a relevant setting element 40, set to relate to a first particular sector of the radio communication cell. The second device 4' is, by means of the second sector indicating hardware 12' and a relevant setting element 40, set to relate to a second particular sector of the radio communication cell. Accordingly, the first sector indicating hardware 12 may comprise a first setting element, such as switch or a connector, for setting the first sector indicating hardware 12 to relate to the first particular sector, and the second sector indicating hardware 12' may comprise a second setting element, such as switch or a connector, for setting the second sector indicating hardware 12' to relate to the second particular sector. The third device 4" is, by means of the third sector indicating hardware 12" and a relevant setting element 40, set to relate to a third particular sector of the radio communication cell. Each device 4, 4', 4" comprises a reading arrangement for reading electronically readable sector information relating to each particular sector from each sector indicating hardware 12, 12', 12". Thus, the controller 8, in communication with the devices 4, 4', 4" may associate each particular sector with one of the devices 4, 4', 4" and their identity.

The first device 4 may be adapted for mounting on a first support structure and the first setting element may be adapted to be set to relate to the first particular sector on location at the first support structure. The second device 4' may be adapted for mounting on the first support structure, or on a second support structure, and the second setting element may be adapted to be set to relate to the second particular sector on location at the first or second support structure.

The network 10 comprises a first and a second multiplexer/demultiplexer 72, 72' which may combine several input signals into one output signal, and/or may take an input signal that carries many channels and separates those over multiple output signals.

In practice a TMA complying with the AISG v2.0 standard may be connected to an RBS via the network 10. The network 10 may be utilized for Radio Frequency-feed (RF-feed) signals. The TMA may extract signals for both the TMA and the RET 70 from the RF-feed signals. The TMA may be connected to the RET 70 by means of an RS-485 bus. The TMA may be adapted to convert signals to the RET to RS-485 complying format. The sector indicating hardware 12 may in this case comprise a connector socket 38 or plug of an RS-485 connector. The RS-485 connector may have four conductors, such as conductor pins of the socket or plug, which are not required for the RS-485 bus as such. The configuration may be according to the following: Pins Nos. 1, 2, 4 and 8 not used, pin No. 3 Supplied voltage Vb, pin No. 5 Supplied voltage Va, pin No. 6 10V-30V DC voltage, and pin No. 7 DC return.

The sector indicating hardware 12 may thus comprise a setting element 40 comprising a connecting element 42 for interconnecting at least two of the non-used conductors of the connector socket 38. As mentioned above the setting element 40 may be for instance colour coded depending on which conductors are interconnected of a particular setting element 40. The interconnected conductors and the colour coding may thus relate to a particular sector. For instance may the following be used: Sector 1, Colour red, no pins interconnected; Sector 2, Colour green, pins 4 and 8 interconnected; Sector 3, Colour blue, pins 4 and 2 interconnected; Sector 4, Colour yellow, pins 4, 2 and 8 interconnected; Sector 5, Colour orange, pins 4 and 1 interconnected; Sector 6, Colour pink, pins 4, 1 and 8 interconnected; Sector 7, Colour purple, pins 4, 1 and 2 interconnected; Sector 8, Colour white, pins 4, 1, 2 and 8 interconnected.

A TMA may comprise a reading arrangement for reading which of the conductor pins are interconnected, i.e. reading the thus, in the indicating hardware 12, comprised electronically readable sector information. This electronically readable sector information may be utilized for configuring data related to the particular sector of the TMA such that identity related information of the TMA may be associated with the particular sector. For instance may an octet of the TMA:s identity information, such as the uniqueID according to AISG v2.0 standard, be set to comprise sector related information. The uniqueID comprises a vendor code (2 octets long) and a 1 to 17 octets long unit specific code (e.g. serial number) exclusive for each secondary device from the vendor to whom the vendor code is assigned. The vendor code is placed in the left-most (most significant) position of the unique ID. The vendor to whom the vendor code is assigned is responsible for ensuring the uniqueness of the unique ID for each device.

A system similar to the system 2 of FIG. 7 is disclosed in US 2007/0173288 A1 disclosing method and apparatus for reducing combiner loss in a multi-sector omni-base station however, without any sector indicating hardware. The system of US 2007/0173288 A1 is sometimes referred to as Psi-Coverage base station concept. The use of sector indicating hardware 12 lends itself well for use in the Psi- Coverage concept to ensure that a controller of the RBS associates each of three TMA:s with a correct particular sector.

Figure 8:
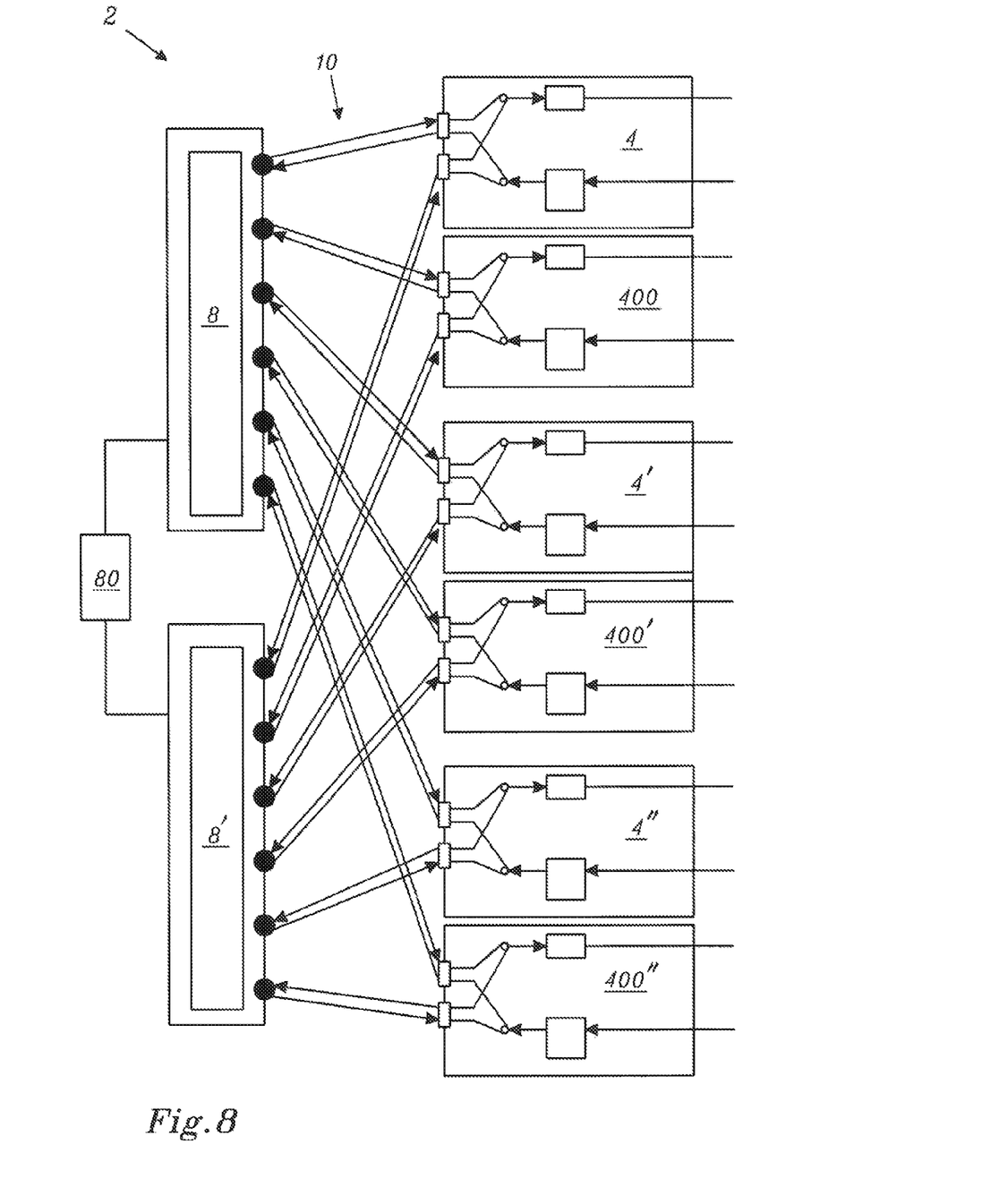

FIG. 8 illustrates embodiments of a system 2 forming part of a radio communication system and comprising radio communication equipment. The system 2 comprises six devices 4, 4', 4", 400, 400', 400" being assigned to six identities. The devices 4, 4', 4", 400, 400', 400" are adapted to be supported by one or more support structures such as antenna masts or walls of built structures. Each device 4, 4', 4", 400, 400', 400" is associated with a particular sector of a radio communication cell. The first, second and third devices 4, 4', 4" may relate to a first cluster of sectors of a radio communication cell, e.g. with sector numbers one, two and three. The fourth, fifth, and sixths devices 400, 400', 400" may relate to a second cluster of sectors. The second cluster of sectors may relate to the same radio communication cell and sectors as the first cluster, i.e. sectors one, two, and three or the second cluster may relate to three different sectors of a different radio communication cell than the first cluster of sectors.

The devices 4, 4', 4", 400, 400', 400" may be Remote Radio Units (RRU:s) or Antenna Integrated Radios (AIR:s) which are connected to a first controller 8 and a second controller 8' comprised in the system 2. The controllers 8, 8' are located at a distance from the devices 4, 4', 4", 400, 400', 400" and is connected to the devices 4, 4', 4", 400, 400', 400" via a network 10 comprising for instance optical fibre. The network 10 may comprise one connection between each device 4, 4', 4", 400, 400', 400" and each controller 8, 8'. Accordingly, each controller 8, 8' is associated with at least a first particular sector and a second particular sector of a radio communication cell. Each of the devices 4, 4', 4", 400, 400', 400" comprises a sector indicating hardware 12, for instance as illustrated in FIG. 6. Thus, a visual sector information relating to a particular sector, an electronically readable sector information relating a particular sector, a visual location information relating to a particular location, and an electronically readable location information relating to a particular location may be set for each of the devices 4, 4', 4", 400, 400', 400". Each device 4, 4', 4", 400, 400', 400" comprises a reading arrangement for reading the electronically readable sector information and for reading the electronically readable location information from the sector indicating hardware.

Accordingly, the first device 4 may comprise a first location indicating hardware 62, and the first location indicating hardware comprises a first visual location information relating to a location of the first device such that the first visual location information is visible to a human, and a first electronically readable location information relating to the location of the first device 4. The first reading arrangement may be adapted to read the first electronically readable location information from the first location indicating hardware 62. The second device 4' may comprises a second location indicating hardware 62, and the second location indicating hardware may comprise a second visual location information relating to a location of the second device such that the second visual location information is visible to a human, and a second electronically readable location information relating to the location of the second device. The second reading arrangement may be adapted to read the second electronically readable location information from the second location indicating hardware 62. The remaining devices 4", 400, 400', 400" may be arranged similarly with respective location indicating hardware and reading arrangements.

The controllers 8, 8' may be comprised in a Main Unit (MU), a Radio Base Station (RBS), a Base Band Unit, a Node B, or similar apparatus of the radio communication system. The MU, RBS, Base Band Unit, Node B, or similar apparatus of the radio communication system may be seen as a radio device associated with radio communication in at least one particular sector of a radio communication cell. The controllers 8, 8' may establish a correct connection between the devices 4, 4', 4", 400, 400', 400" and the controllers 8, 8'. Alternatively, the controllers 8, 8' may be separate from an MU 80, RBS, Base Band Unit, Node B, or similar apparatus of the radio communication system. Accordingly, the controllers 8, 8' may be adapted to connect at least one of the device 4, 4', 4", 400, 400', 400" to a radio device 80 associated with radio communication in a particular sector. The controllers 8, 8' may establish a correct connection between the devices 4, 4', 4", 400, 400', 400" and the MU 80, etc. The controllers 8, 8' may utilize software for establishing the correct connection.

Figure 9:
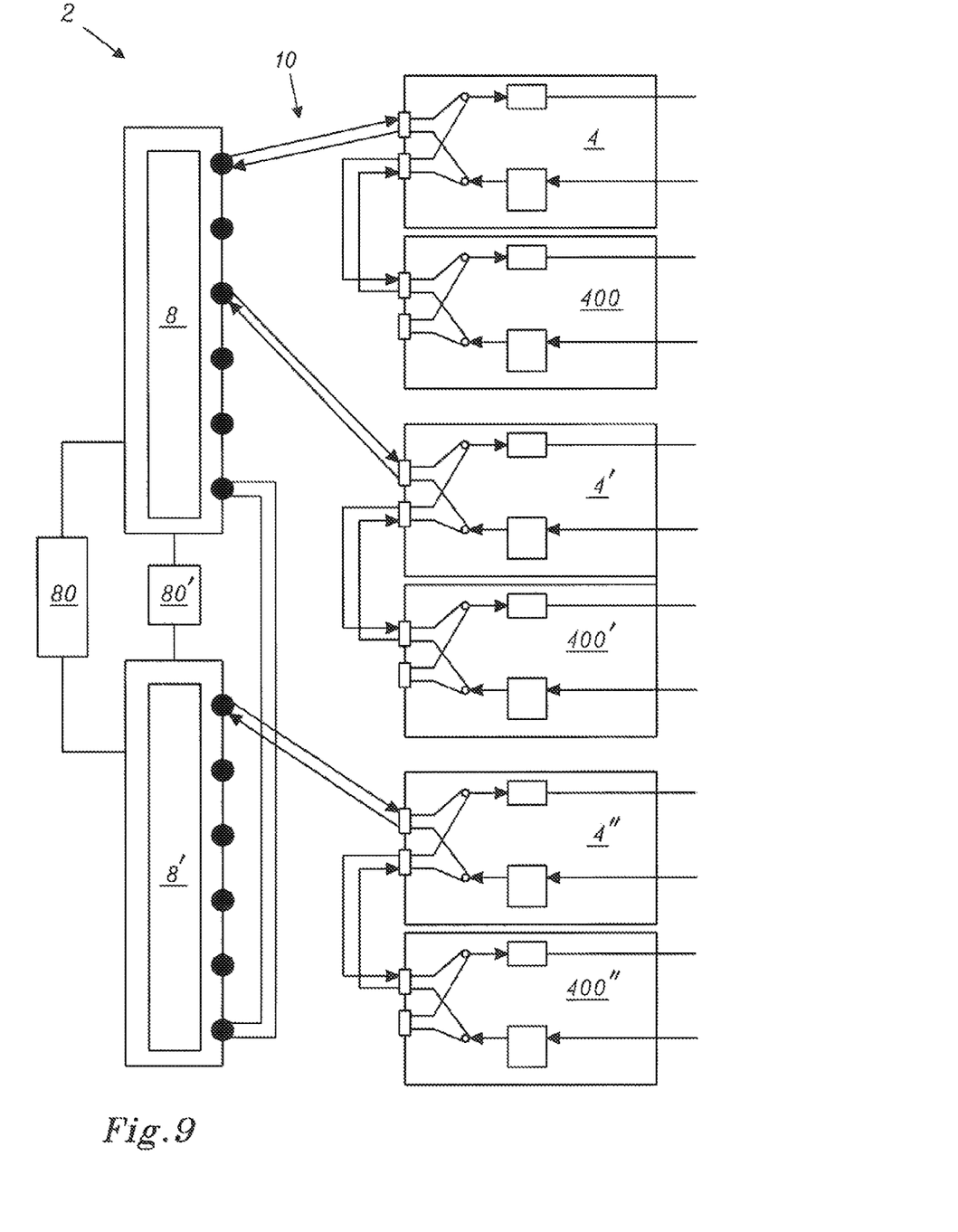

Thus, the controllers 8, 8', in communication with the devices 4, 4', 4", 400, 400', 400", may associate a particular sector and a particular location with a particular device 4, 4', 4", 400, 400', 400". Accordingly, the controllers 8, 8' are adapted to send an inquiry to each device 4, 4', 4", 400, 400', 400", which inquiry is for an identity related information related to each device 4, 4', 4", 400, 400', 400". Furthermore, the controllers 8, 8' are adapted to send an inquiry to each device 4, 4', 4", 400, 400', 400", which inquiry is for a location related information related to each device 4, 4', 4", 400, 400', 400". Alternatively, the devices 4, 4', 4", 400, 400', 400" may communicate the identity related information related to each device 4, 4', 4", 400, 400', 400" and the location related information related to each device 4, 4', 4", 400, 400', 400" to the controllers 8, 8' without a preceding inquiry. The controllers 8, 8' may accordingly, assign each identity related information to each device 4, 4', 4", 400, 400', 400" and each location related information to each device 4, 4', 4", 400, 400', 400". Thus, in the system 2, radio communication signals may be directed via the network 10 between the controllers 8, 8', or the MU 80, etc. and the respective devices 4, 4', 4", 400, 400', 400" according to radio communication standards, depending on in FIG. 9 illustrates embodiments of a system 2 forming part of a radio communication system and comprising radio communication equipment. These embodiments resemble in much the embodiments of FIG. 8. However, the network 10 is configured differently and thus the first controller 8 communicates with the fourth device 400 via the first device 4, with the fifth device 400' via the second device 4', and with the third and sixths devices 4", 400" via the second controller 8'. The second controller 8' communicates with the first, second, forth, and fifth devices 4, 4', 400, 400' via the first controller 8 and with the sixths device 400" via the third device 4". This may be referred to as the devices 4, 4', 4", 400, 400', 400" being cascaded.

Again, the controllers 8, 8' may be comprised in a Main Unit (MU), a Radio Base Station (RBS), a Base Band Unit, a Node B, or similar apparatus of the radio communication system. The MU, RBS, Base Band Unit, Node B, or similar apparatus of the radio communication system may be seen as a radio device associated with radio communication in at least one particular sector of a radio communication cell. The controllers 8, 8' may establish a correct connection between the devices 4, 4', 4", 400, 400', 400" and the controllers 8, 8'. Alternatively, the controllers 8, 8' may be separate from one or more MU:s 80, 80', RBS, Base Band Units, Node B:s, or similar apparatuses of the radio communication system. Accordingly, the controllers 8, 8' may be adapted to connect at least one of the devices 4, 4', 4", 400, 400', 400" to a radio device 80 associated with radio communication in a particular sector. Similarly, the controllers 8, 8' may be adapted to connect e.g. the fifth device 400' to a second radio device 80' associated with radio communication in a particular sector. The controllers 8, 8' and may establish a correct connection between the devices 4, 4', 4", 400, 400', 400" and the MU:s 80, 80', etc. The controllers 8, 8' may utilize software for establishing the correct connection.

Figure 10:
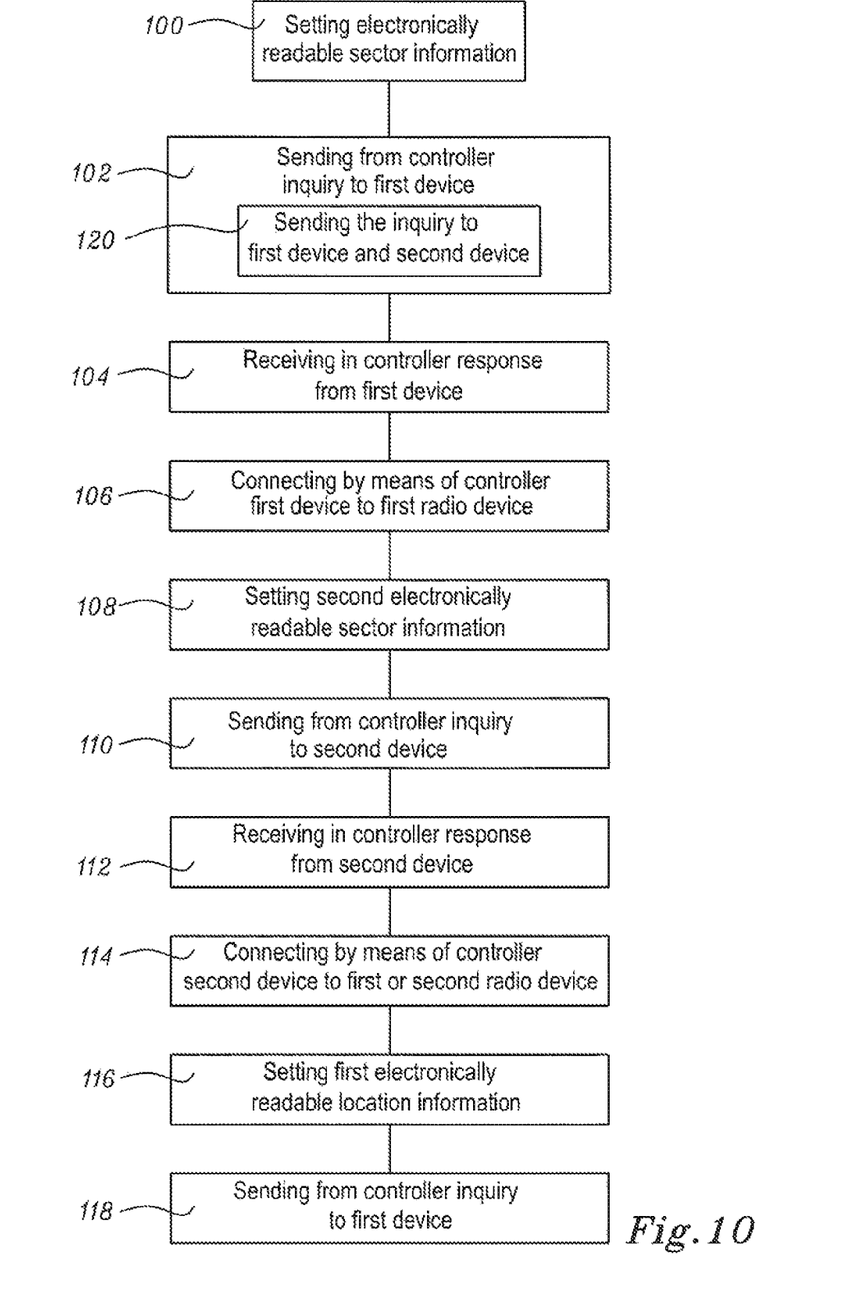
FIG. 10 illustrates embodiments of a method of establishing a connection via a network between a controller and at least one device.

FIG. 10 illustrates embodiments of a method of establishing a connection via a network between a controller and at least one device. A first device is assigned to a first identity. The controller is located at a distance from the first device and the first device is associated with a first particular sector of a radio communication cell. The first device comprises a first sector indicating hardware which provides electronically readable sector information relating to the first particular sector. The method comprises:

Setting 100 the electronically readable sector information relating to the first particular sector on the first sector indicating hardware manually, and sending 102 from the controller via the network an inquiry to the first device. The inquiry is for a first identity related information related to the first device. The inquiry is directed to the first device based on its association with the first particular sector.

The method may further comprise receiving 104 in the controller a response from the first device, which response comprises the first identity related information related to the first device.

The method may further comprise connecting 106 by means of the controller the first device to a first radio device associated with radio communication in the first particular sector.

The method may further comprise establishing a connection via the network between the controller and a second device. The second device is assigned to a second identity. The controller is located at a distance from the second device and the second device is associated with a second particular sector of the radio communication cell. The second device comprises a second sector indicating hardware which provides second electronically readable sector information relating to the second particular sector. The method may comprise: Setting 108 the second electronically readable sector information relating to the second particular sector on the second sector indicating hardware manually, and sending 110 from the controller via the network an inquiry to the second device. The inquiry is for a second identity related information related to the second device. The inquiry is directed to the second device based on its association with the second particular sector.

The method may further comprise receiving 112 in the controller a response from the second device, which response comprises the second identity related information related to the second device.

The method may further comprise connecting 114 by means of the controller the second device to the first radio device associated with radio communication in the first particular sector or to a second radio device associated with radio communication in the second particular sector.

The first device may further comprise a first location indicating hardware which comprises a first electronically readable location information relating to the first device. The method may further comprise: Setting 116 the first electronically readable location information relating to a location of the first device on the first location indicating hardware manually, and sending 118 from the controller via the network an inquiry to the first device. The inquiry is for a first identity related information related to the first device. The inquiry is directed to the first device based on its association with the location of the first device.

According to embodiments sending 102 from the controller via the network an inquiry to the first device may comprise sending 120 the inquiry to the first device and the second device.

According to embodiments an identification number of the first device may comprise sector related information relating to the first particular sector, and an identification number of the second device may comprise sector related information relating to the second particular sector.

According to embodiments the first device and the second devices may comprise an Antenna Line Device (ALD), or a Remote Radio Unit (RRU), or an Antenna Integrated Radio (AIR), or a Tower Mounted Amplifier (TMA), or a Remote Electrical Tilting device (RET).

In practice a method according to embodiments may relate to a radio communication system 2 comprising a controller 8, a first device 4 comprising a TMA assigned to a first identity, and a second device 4' comprising a TMA assigned to a second identity. The method is in compliance with the AISG v 2.0 standard. The controller 8 is connected to at least the first device 4 and the second device 4' via a network 10. The first device 4 and the second device 4' are located at a distance from the controller 8. The first device 4 is associated with a first particular sector of a radio communication cell and the second device 4' is associated with a second particular sector of the radio communication cell. The first device 4 comprises a first sector indicating hardware 12 and the second device 4' comprises a second sector indicating hardware 12'. Each TMA is associated with an RET. The first sector indicating hardware 12 comprises a first visual sector information relating to the first particular sector such that the first visual sector information is visible to a human, and a first electronically readable sector information relating to the first particular sector. The second sector indicating hardware comprises a second visual sector information relating to the second particular sector such that the second visual sector information is visible to a human, and a second electronically readable sector information relating to the second particular sector. Each TMA comprises a reading arrangement 14, 14' for reading electronically readable sector information relating to a particular sector from a sector indicating hardware 12, 12'. Each TMA is adapted to configure a last octet of its uniqueID according to the electronically readable sector information.

The controller 8 may use that last octet of the uniqueID to connect to the TMA:s in a sequenced manner:

The controller 8 sends an inquiry via the network 10 to the TMA of the first particular sector. The inquiry is for a first identity related information related to the first TMA.

The controller 8 receives a response from the first TMA, which response comprises the first identity related information.

Assign an HDLC address to the first TMA with uniqueID relating to a first particular sector. HDLC stands for High-Level Data Link Control and is a bit-oriented synchronous data link layer protocol developed by the International Organization for Standardization (ISO).

The first TMA switches DC ON to its associated RET after receiving an HDLC address.

An HDLC address is assigned to RET with uniqueID. There is only one RET visible to the controller 8, because all other RETs have no DC (because the TMAs connected to them have no HDLC address) and are therefore off-line. The RET will respond with its whole uniqueID and the controller 8 may store it in relation to the first TMA and the first particular sector.

Send an L2-restart message to the first TMA. The first TMA will loose its HDLC address, go back to the "NoAddress" state and switch the DC off to the RET, which will also loose its HDLC address.

Assign HDLC address to the second TMA with uniqueID relating to the second particular sector.

The second TMA switches DC ON to the relevant RET after receiving an HDLC address.

An HDLC address is assigned to RET with uniqueID. There is only one RET visible to the controller on the site, because all other RETs have no DC (because the TMA:s connected to them have no HDLC address) and are therefore off-line. The RET will respond with its whole uniqueID and the controller 8 will store it in relation to the second TMA and the second particular sector.

Send an L2-restart message to the second TMA. The TMA will loose its HDLC address, go back to the "NoAddress" state and switch the DC off to the RET, which will also loose its HDLC address.

The controller 8 has, at this point, full knowledge of the TMA's and RET's uniqueID:s and more importantly, how they are installed in relation to the antenna system, i.e. which device relates to which particular sector.

The controller 8 uses these uniqueIDs to assign HDLC addresses to all units and configures them according to a desired sector configuration.

This allows the system to know with certainty to which TMA each RET is connected. Service personnel need not bother about the relation between uniqueID and physical sectors as uniqueID is set by means of the sector indicating hardware.

Example embodiments described above may be combined as understood by a person skilled in the art. It is also understood by those skilled in the art that the device related to radio communication equipment may be an Antenna Integrated Radio (AIR) or a Remote Electrical Tilting device (RET). A controller may be connected to one or more TMA:s via one TMA, i.e. the TMA:s may be cascaded. In embodiments according to FIGS. 8 and 9, one controller 8 may be connected to all devices 4, 4', 4", 400, 400', 400".

Although example embodiments have been described, many different alterations, modifications and the like will become apparent for those skilled in the art. The sector indicating hardware and/or the location indicating hardware may comprise a dip switch. An electronic display may be utilized for showing the visual sector information. In this case a button connected to a controller may be used for setting the visual sector information and the electronically readable sector information. A sector indicating hardware comprising a rotary switch for setting sector information and/or location information may utilize Gray encoding for setting the electronically readable sector information. Sector indicating hardware and/or reading arrangement and/or location indicating hardware do not have to be separate devices, and thus two or many functionalities may be incorporated in the same hardware.

Therefore, it is to be understood that the foregoing is illustrative of various example embodiments. Modifications to the disclosed embodiments, combinations of features of disclosed embodiments as well as other embodiments are intended to be included within the scope of the appended claims.

As used herein, the term "comprising" or "comprises" is open-ended, and includes one or more stated features, elements, steps, components or functions but does not preclude the presence or addition of one or more other features, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "on", "coupled" or "connected" to another element, it can be directly on, coupled or connected to the other element or intervening elements may also be present. In contrast, when an element is referred to as being "directly on", "directly coupled" or "directly connected" to another element, there are no intervening elements present.

It will be understood that although the terms first, second, third etc. may be used herein to describe various elements, components, regions, layers and/or sections, these elements, components, regions, layers and/or sections should not be limited by these terms. These terms are only used top distinguish one element, component, region, layer or section from another element, component, region, layer or section. Thus, a first element, component, region, layer or section discussed herein could be termed a second element, component, region, layer or section.

Example embodiments have been described herein with reference to schematic illustrations of idealized embodiments. As such, variations from the shapes of the illustrations as a result, for example, of manufacturing techniques and/or tolerances are to be expected. Thus, embodiments should not be construed as limited to the particular shapes of regions illustrated herein but are to include deviations in shape that result, for example, from manufacturing.

The invention claimed is:

1. A device comprising:
radio communication equipment configured for radio communication in a single particular one of multiple sectors of a radio communication cell;
an electronic circuit; and
sector indicating hardware configured to indicate both visually to a human and electronically to the electronic circuit that the device's radio communication equipment is configured for radio communication in said single particular sector, wherein the sector indicating hardware is configured to visually indicate a single particular one of multiple different possible visual characteristics defined as being respectively specific to the different sectors of the radio communication cell.

2. The device according to claim 1, wherein the sector indicating hardware is selected from multiple different sector indicating hardware that are visually distinguishable from each other as respectively setting the device's radio communication equipment for radio communication in different sectors of the radio communication cell.

3. The device according to claim 2, wherein the different sector indicating hardware are visually distinguishable from each other by being at least one of differently shaped, differently colored, and differently marked.

4. The device according to claim 1, wherein the device is configured to receive and respond to an inquiry from a controller located remotely from the device requesting that the device respond with information related to an identity of the device if the device's radio communication equipment is configured for radio communication in said single particular sector.

5. The device according to claim 1, wherein the sector indicating hardware comprises a setting element configured to set the device's radio communication equipment for radio communication in said single particular sector.

6. The device according to claim 5, wherein the device is configured to mount onto a support structure and wherein the setting element is configured to set the device's radio communication equipment for radio communication in said single particular sector on location at the support structure.

7. The device according to claim 5, wherein the device further comprises a connector socket or connector plug and wherein the setting element comprises a connecting element configured to interconnect at least two conductors of the connector socket or connector plug.

8. The device according to claim 7, wherein the setting element comprises one setting element in a set of different setting elements that comprise different connecting elements, wherein the different connecting elements are visually distinguishable from each other as being configured to interconnect different conductors of the connector socket or connector plug for setting the device's radio communication equipment for radio communication in different sectors of the radio communication cell.

9. The device according to claim 8, wherein the electronic circuit is configured to read which conductors of the connector socket or connector plug are interconnected by the setting element.

10. The device according to claim 5, wherein the setting element comprises a switch configured to be switched to one of different possible positions that are visually marked or colored as respectively setting the device's radio communication equipment for radio communication in different particular sectors of the radio communication cell.

11. The device according to claim 1, wherein the device comprises an Antenna Line Device (ALD), a Remote Radio Unit (RRU), an Antenna Integrated Radio (AIR), a Tower Mounted Amplifier (TMA), or a Remote Electrical Tilting (RET) device.

12. Sector indicating hardware comprising a setting element configured to set a device's radio communication equipment for radio communication in a single particular one of multiple sectors of a radio communication cell, the sector indicating hardware configured to be comprised in the device and to indicate both visually to a human and electronically to an electronic device that the device's radio communication equipment is configured for radio communication in said single particular sector.

13. The sector indicating hardware according to claim 12, wherein the sector indicating hardware has a single particular one of multiple different possible visual characteristics defined as being respectively specific to the different sectors of the radio communication cell.

14. The sector indicating hardware according to claim 12, wherein the sector indicating hardware is selected from multiple different sector indicating hardware that are visually distinguishable from each other as respectively setting the device's radio communication equipment for radio communication in different sectors of the radio communication cell.

15. The sector indicating hardware according to claim 14, wherein the different sector indicating hardware are visually distinguishable from each other by being at least one of differently shaped, differently colored, and differently marked.

16. The sector indicating hardware according to claim 12, wherein the setting element comprising a connecting element configured to interconnect at least two conductors of a connector socket or a connector plug of the device.

17. The sector indicating hardware of claim 16, wherein the setting element comprises one setting element in a set of different setting elements that comprise different connecting elements, wherein the different connecting elements are visually distinguishable from each other as being configured to interconnect different conductors of the connector socket or connector plug for setting the device's radio communication equipment for radio communication in different sectors of the radio communication cell.

18. The sector indicating hardware of claim 12, wherein the setting element comprises a switch configured to be switched to one of different possible positions that are visually marked or colored as respectively setting the device's radio communication equipment for radio communication in different particular sectors of the radio communication cell.

19. A set of different sector indicating hardware, the different sector indicating hardware visually distinguishable from each other as comprising different setting elements respectively configured to set a device's radio communication equipment for radio communication in different particular ones of multiple sectors of a radio communication cell.

20. The set according to claim 19, wherein the different sector indicating hardware have different visual characteristics defined as being respectively specific to the different sectors of the radio communication cell.

21. The set according to claim 19, wherein the different sector indicating hardware are visually distinguishable from each other by being at least one of differently shaped, differently colored, and differently marked.

22. The set according to claim 19, wherein the different setting elements comprise different connecting elements that are visually distinguishable from each other as being configured to interconnect different conductors of a connector socket or connector plug of the device for setting the device's radio communication equipment for radio communication in different sectors of the radio communication cell.

23. The device according to claim 1, wherein any radio communication equipment comprised in the device is configured for radio communication in the single particular one of multiple sectors of the radio communication cell.

24. The device according to claim 1, wherein the device is configured to mount onto a radio antenna tower.

25. The sector indicating hardware according to claim 12, wherein any radio communication equipment comprised in the device is configured for radio communication in the single particular one of multiple sectors of the radio communication cell.

26. The device according to claim 1, wherein the sector indicating hardware is configured to selectively indicate any single one of the different possible visual characteristics in order to visually indicate for which of the different sectors of the radio communication cell the radio communication equipment is configured.

27. The device according to claim 26, wherein the sector indicating hardware comprises a switch configured to be switched to any single one of different possible positions corresponding to the different possible visual characteristics in order to visually indicate for which of the different sectors of the radio communication cell the radio communication equipment is configured.

28. The device according to claim 1, wherein the sector indicating hardware is one of multiple different sector indicating hardware, wherein each of the multiple different sector indicating hardware is dedicated for indicating a different respective one of the different possible visual characteristics.

* * * * *